INVENTOR.
JOHN O. SILVEY
BY Philip M. Bolton
ATTORNEY

*INVENTOR.*
JOHN O. SILVEY
*BY* Philip M. Bolton
ATTORNEY

INVENTOR.
JOHN O. SILVEY
BY Philip M. Bolton
ATTORNEY

INVENTOR.
JOHN O. SILVEY
BY
Philip M. Bolton
ATTORNEY

United States Patent Office 2,989,627

Patented June 20, 1961

2,989,627

TELEVISION RECEIVER WITH ULTRA HIGH FREQUENCY CAVITY TUNER INSIDE VERY HIGH FREQUENCY TURRET TUNER

John O. Silvey, Fort Wayne, Ind., assignor to International Telephone and Telegraph Corporation, a corporation of Maryland Filed Aug. 9, 1952, Ser. No. 303,457

16 Claims. (Cl. 250—20)

This invention relates to RF tuning systems, and particularly to such systems as utilized in television receivers.

The tuner unit of the television receiver consists of the RF amplifier, local oscillator, and converter (mixer). These circuits are usually assembled and aligned as a separate unit and function generally to select, amplify and convert the incoming RF signal to a predetermined IF frequency for which the IF stage is aligned. The RF frequencies presently allocated to commercial television, fall within the very high frequency (VHF) band, and, therefore, the tuners designed for present day television receivers may be designated VHF tuners.

With the advent of allocating ultra high frequencies (UHF) for commercial television, there has arisen the problem of designing UHF tuners which may be practically and economically incorporated in the present day television receiver. Many different types of UHF tuners have been developed, which, like the VHF tuner, are assembled and aligned as separate units. Although in a technical sense they have been made to operate satisfactorily, they are costly and bulky, thereby materially increasing the cost of the receiver.

It is the object of this invention to provide a combination VHF-UHF tuner contained in a single unit, which is efficient and economical.

It is a further object of this invention to provide a tuner, of the turret type, for both the VHF and UHF frequency bands.

Another object of the invention is to provide a combination tuner wherein many of the same components are utilized for both VHF and UHF tuning.

Another object of the invention is to provide a unique UHF tuner which is simple and efficient.

In accordance with one aspect of the invention, there is provided a VHF tuner comprising means for selecting a signal of a given VHF frequency, and means for reducing the frequency of the VHF signal to a predetermined IF frequency. In combination with the VHF tuner, there is provided a UHF tuner electrically and mechanically coupled therewith and positioned interiorly of said VHF tuner. The UHF tuner comprises means for selecting a signal of a given UHF frequency and means for reducing the UHF frequency to the predetermined IF frequency. The IF signal produced by the UHF tuner is then injected into the VHF tuner, which now operates simply as an amplifier.

In accordance with another aspect of the invention there is provided a combination VHF-UHF tuner wherein the UHF local oscillator means for producing the predetermined IF frequency includes the local oscillator of the VHF tuner.

The above mentioned and other features and objects of this invention and the manner of attaining them will become more apparent and the invention itself will be best understood by reference to the following description of an embodiment of the invention taken in conjunction with the accompanying drawings, in which:

FIG. 8 showing a section taken along lines 8—8 of FIG. 4.

Figure 1:
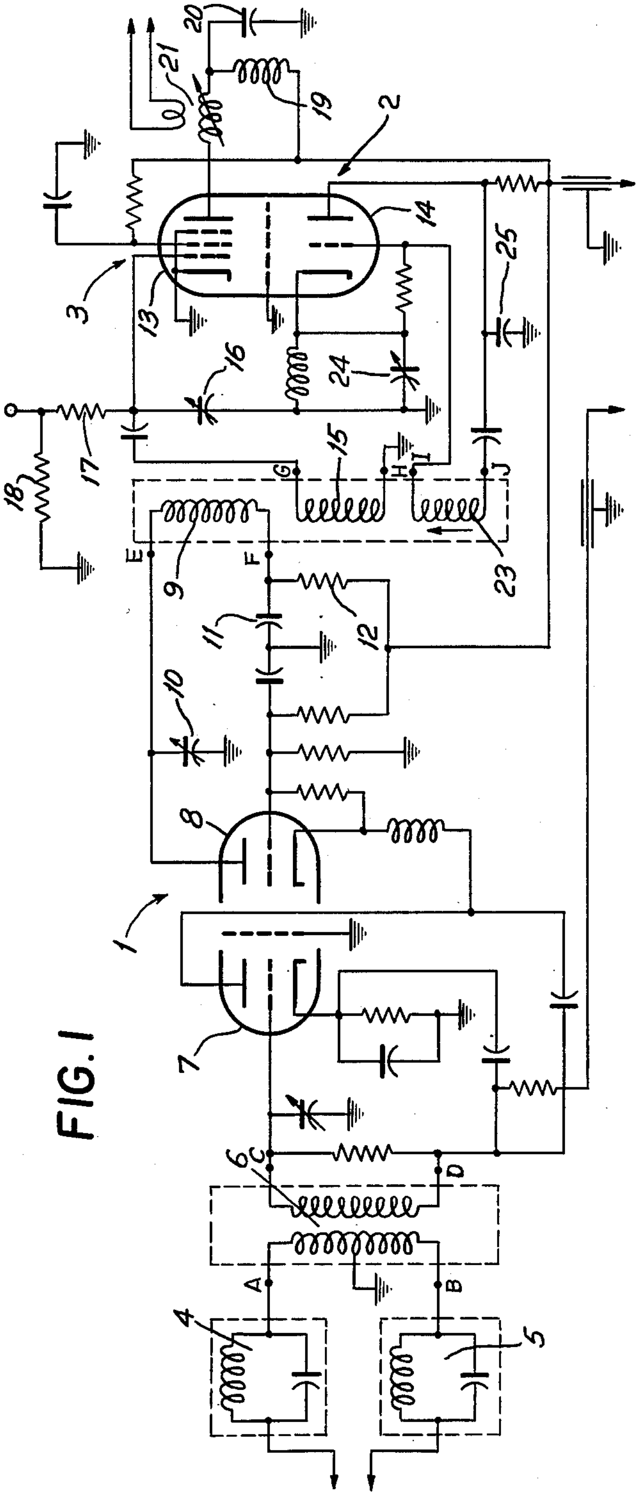
FIG. 1 shows schematically a diagram of the circuits comprising a VHF tuner.

Referring now to FIG. 1 there is shown the VHF tuner comprising an RF amplifier section 1, a local oscillator 2 and a converter 3. The desired channel is selected by switching the turret tuner (shown in FIG. 4), whereby the proper sets of coils are inserted into the amplifier, converter and oscillator circuits. Since turret tuners are well known to the art, the mechanical operation of the tuner will not be described, except as it affects the novelty of this invention. Further, the circuitry shown by FIG. 1 is known to the art and, therefore, the detailed operation of each of the component parts will be omitted from the explanation.

The signal from an antenna is coupled through tuned antenna input circuits 4, 5, to the first RF stage through a center tapped transformer indicated at 6. The RF signals are fed to the grid of tube 7 and are amplified in this circuit, which is the first stage of a two-stage amplifier. The two-stage amplifier may be of the type known as a driven grounded-grid RF amplifier. The plate circuit of the second stage 8, of the RF amplifier, is tuned by the inductance of the primary winding 9 of the mixer input coil in conjunction with the parallel combination of capacitor 10 and tube output capacitance in series with capacitor 11. Capacitor 10 is an adjustable trimmer capacitor. The primary winding 9 is the plate load for the RF amplifier 8; resistor 12 is provided to broaden the response of this circuit.

A pentode-triode type tube may be employed as a mixer-oscillator tube; one section 13 being used as a mixer and the other section 14, as the oscillator. The grid circuit of the mixer tube receives the RF signal and oscillator signal from the secondary 15 of the mixer input coil which is inductively coupled to both the oscillator and RF amplifier. Grid leak bias for the mixer is developed by capacitor 16, resistors 17 and 18. Capacitor 16 is an adjustable trimmer capacitor for peaking the mixer grid circuit. Coil 19, which provides the plate load for the mixer, is by-passed by capacitor 20 in order to prevent regenerative feedback in the mixer. Adjustable coil 21 couples the mixer output to the first IF amplifier stage.

The second half of the tube is employed as a modified Colpitts type oscillator. The oscillator coil 23 is inductively coupled to the mixer grid via mixer coil 15 for oscillator injection. Capacitors 24 and 25 form the split capacitor of the Colpitts oscillator. Capacitor 24 may be a variable dielectric type capacitor used for oscillator "fine tuning."

Thus, operating as a VHF tuner, the RF tuned amplifier 1 selects a signal of a given frequency in the VHF band and applies this signal to the grid of the mixer 3. The oscillator 2 provides a local frequency which is applied to the mixer, where it, together with the RF signal, is heterodyned and converted to an IF frequency. The output from the mixer is then applied to the first IF stage.

Figure 2:
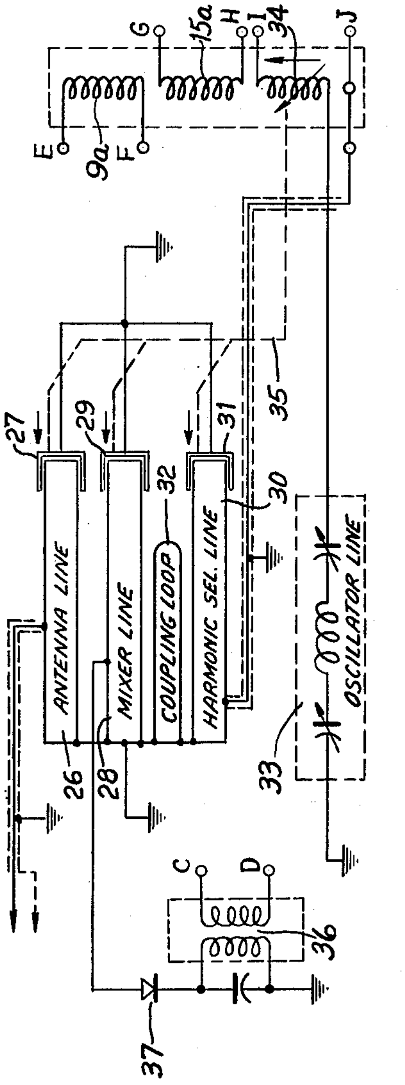
FIG. 2 shows schematically a diagram of the UHF tuner, forming an embodiment of the invention.

Referring now to FIG. 2, the UHF tuner, shown schematically, comprises, preferably, a tuned antenna circuit of the coaxial line type 26, tunable by a variable plunger type capacitor 27 at the open end of a quarter-wave line. The tuned antenna line may be aperture-coupled to a tuned crystal detector line 28, tunable by a variable capacitor 29 at the open end of the quarter-wave line. The proper local frequency is selected by a harmonic selector line 30, tunable by a variable capacitor 31 at the open end of the quarter-wave line. The line 30 is tuned to a third harmonic of the VHF oscillator and may be loop-coupled shown at 32 to the mixer line. The oscillator of the VHF circuit is tuned to one third frequency of the UHF frequency by a variable oscillator line 33 coupled to a variable oscillator coil 34 which is inserted into the VHF oscillator circuit for UHF reception. The variable capacitors 27, 29 and 31 respectively, and the variable inductance 34 are ganged mechanically as indicated at 35.

A transformer coupling 36 is coupled on the secondary side to a crystal detector 37, and is tuned in accordance with present day standards to 41.25–45.75 mc. In the UHF position of the turret the transformer 36 provides grid tuning for the first stage of the RF amplifier 1. The coils 9, 15 and 23 are also adjusted for an output of 41.25–45.75 mc., and in the UHF position provides plate tuning for the second stage of the amplifier 1 and grid tuning for the oscillator 2 and mixer 3, respectively. Since the VHF tuner operates into a 41.25–45.75 mc. IF amplifier, also in accordance with present day standards, then at UHF the RF amplifier and mixer provide additional IF amplification to compensate for the conversion loss, and absence of RF amplification.

When the tuner is switched from VHF to UHF, the component strips shown by dotted lines in FIG. 1 are switched out of circuitry and the component strips shown in FIG. 2, are switched into circuit operating connection. Therefore, coil 9*a* replaces coil 9 in the plate circuit of amplifier 8, coil 15*a* replaces 15, coil 34 replaces 23, etc. The terminals represented by lettered circles A–J indicate the position at which the coils are connected into the circuit.

Figure 3:
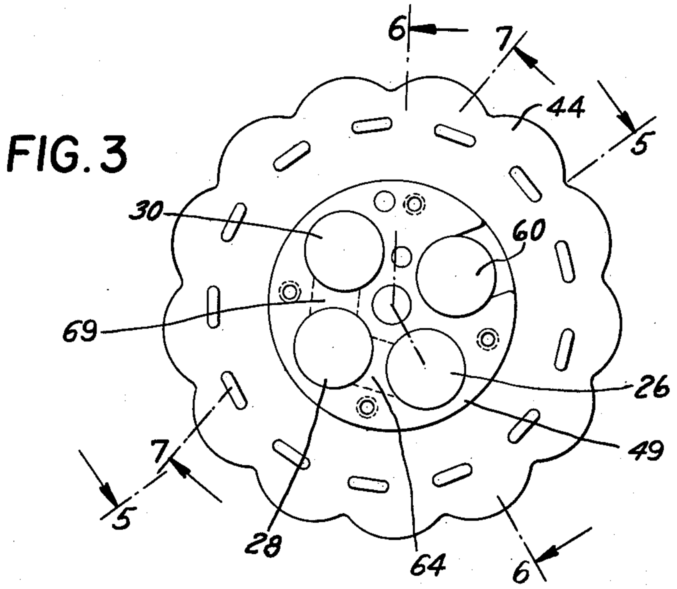
FIGS. 3–8 show the mechanical construction of the combination VHF-UHF turret tuner: the FIGS. 5–7 representing sections taken along corresponding lines of FIG. 3.
Figure 5:
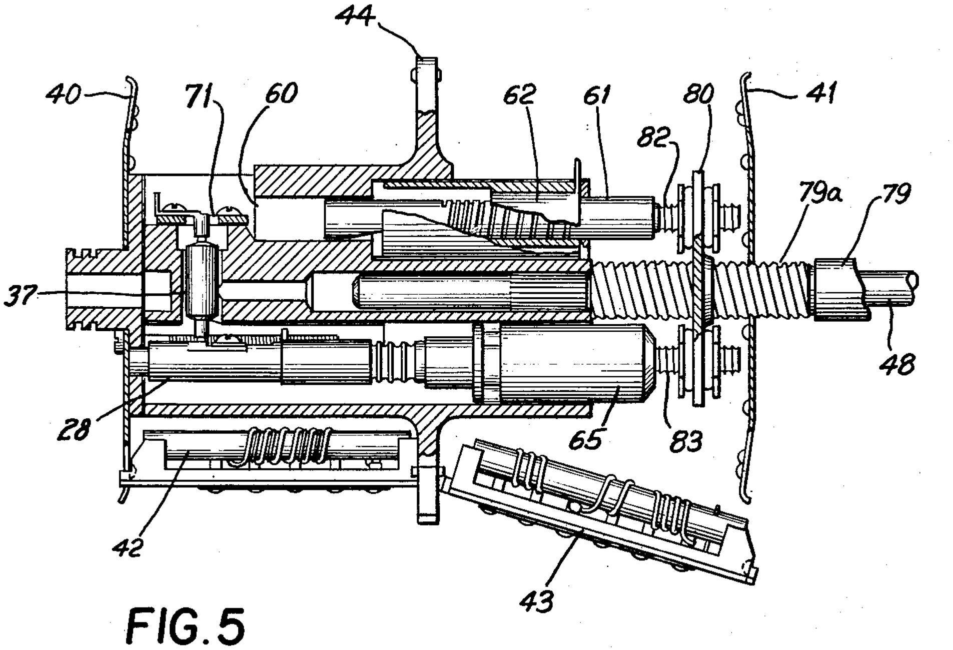
Figure 4:
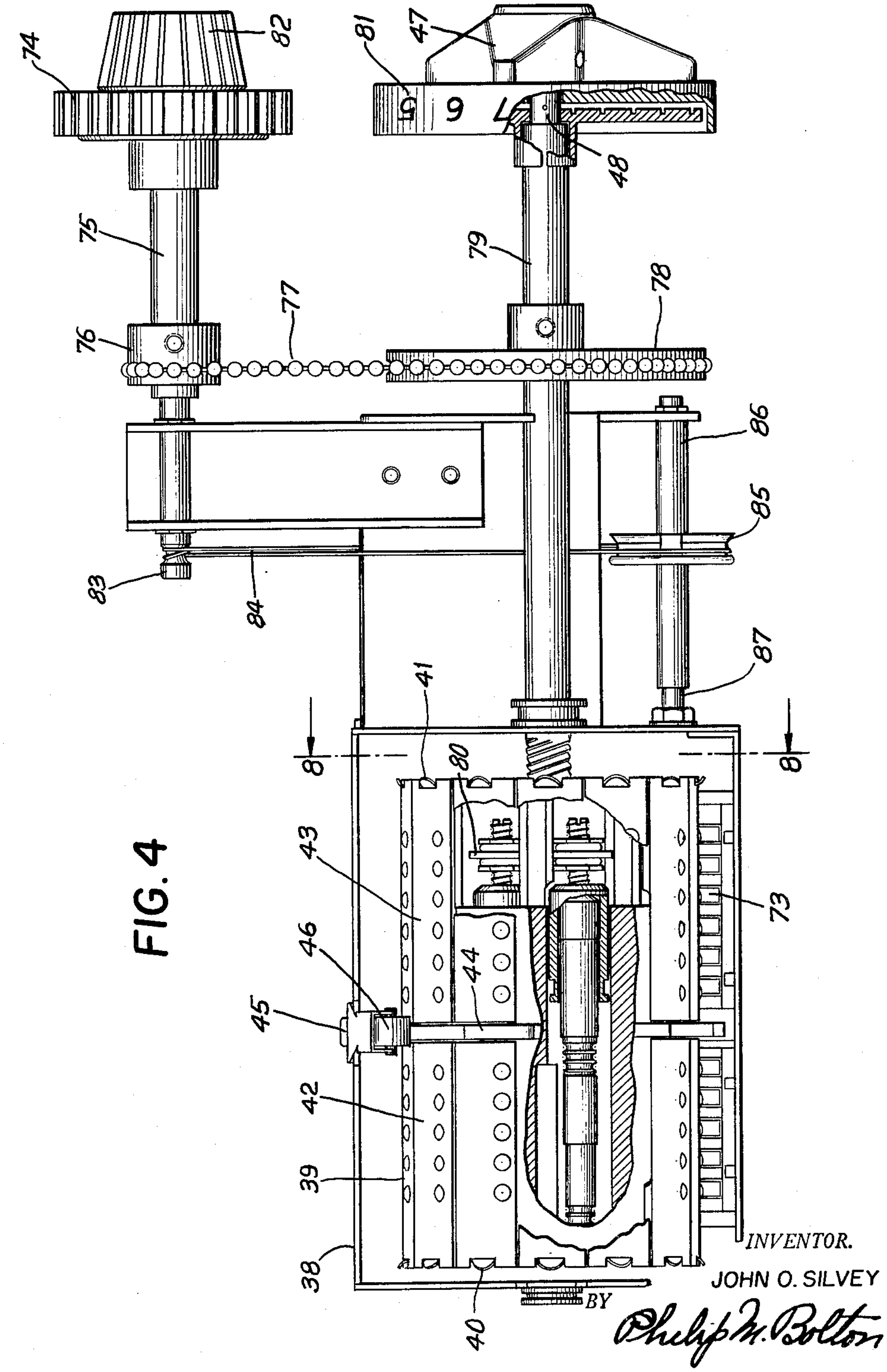

As best seen in FIGS. 3, 4, 5 and 8, housing 38 is provided for the turret tuner 39. The turret tuner comprises a pair of spring plates 40 and 41 respectively (FIG. 5), positioned at either ends of the turret to secure the outer ends of circuit component panels generally indicated at 42 and 43. The spring plates are fastened (described hereinafter) to a UHF tuner cylinder or support 49 by means such as screws 49*a*. The other ends of the panels 42, 43 are secured in place by a scallop shaped disk 44 (FIG. 3) positioned intermediate the spring plates 40 and 41 respectively. Sufficient scallops are formed on disk 44 to provide 13 positions; each position being referenced by the detents in the scallop. A detent spring 45 (FIGS. 4, 8) attached to the turret housing 38 forces a detent spring wheel 46 to ride on the scallop surface of the disk 44. The turret 39 is rotated by a tuning dial knob 47 coupled to the turret by a shaft 48 (FIGS. 4, 5).

The structure of the turret tuner for the VHF circuit components is described and claimed in co-pending application Serial No. 303,489, filed August 9, 1952, now Patent No. 2,706,252, granted April 12, 1955.

Interiorly of the VHF turret component members, there is mounted on the shaft 48 (FIG. 5) the UHF tuner assembly. The UHF tuner assembly is mounted in a cylinder 49 and comprises the tunable quarter-wave lines illustrated in FIG. 2.

Figure 6:
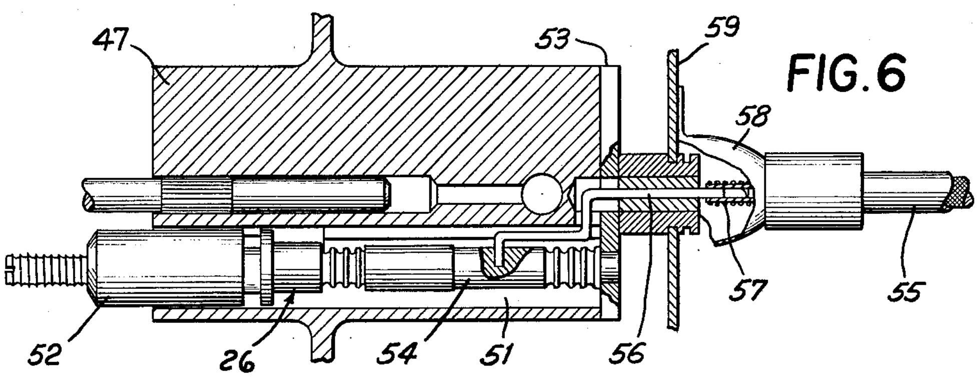

Referring to FIG. 6, which is a section taken along lines 6—6 of FIG. 3, the antenna coaxial line 26 is a quarter-wave coaxial line housed in a cavity 51 and tuned by means of a plunger type capacitor 52 at the open end of the line. A ground plate 53 is provided to short circuit the inner conductor 54 of the coaxial line 55 with the tuner housing. The input energy is applied over the coaxial line 55 to the antenna input lead 56 over a rotatable antenna contact 57. The outer conductor 58 of the coaxial line 55 is grounded to a portion of the tuner chassis 59 and rotatable thereon. The antenna contact 57 is made rotatable to permit rotation of the tuner assembly without twisting the antenna input leads.

Referring for a moment to FIG. 2, the oscillator line 33, which operates as a variable tuned circuit, is tuned to one-third frequency of the RF energy. The third harmonic of the oscillator energy is taken from the plate circuit of oscillator 14 and fed to the harmonic selector line 30. As best seen in FIG. 5, the tuning oscillator, corresponding to oscillator line 33 and coil 34 shown in FIG. 2, comprises an oscillator cavity 60 which is tuned by an oscillator plunger 61 at the open end of the line. Capacitance is provided by capacitor plate 62.

The RF energy from the antenna line 26 is coupled to the mixer line 28 (FIG. 5) by means such as aperture coupling 64 (FIG. 3). The mixer line 28 is preferably tuned by a plunger type capacitor 65.

The RF energy and the oscillator energy are mixed preferably in a crystal type mixer 37 (corresponding to detector 37 of FIG. 2). A by-pass may be provided for the RF energy by a low value inductance 71.

Figure 7:
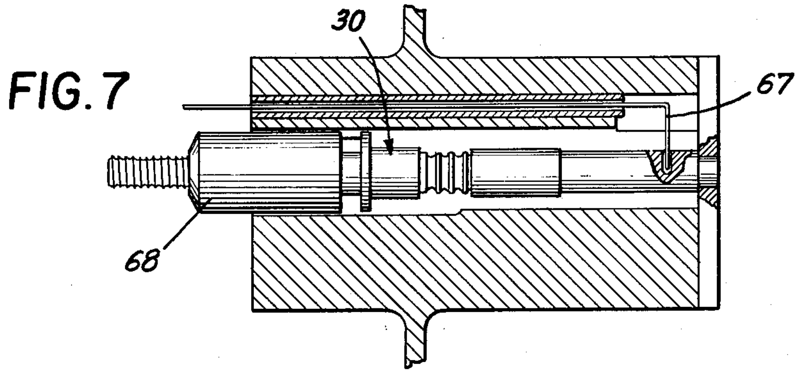
Figure 8:
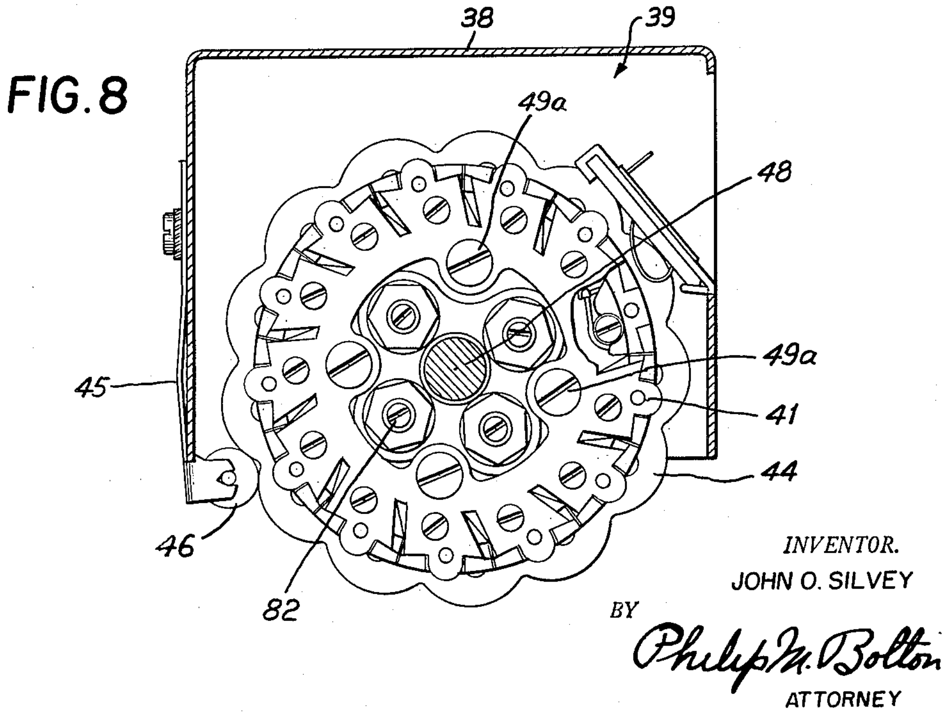

Referring now to FIG. 7, a coaxial line, corresponding to harmonic selector line 30 (FIG. 2) is fed by an oscillator injection line 67. The coaxial line 30 is tuned by means of a plunger type capacitor 68 to the third harmonic of the local oscillator, which according to present day standards is preferably 41.25 mc. above the RF antenna line frequency.

The harmonic selector line 30 is coupled to the mixer line 28 by aperture coupling 69 and a coupling loop 32 (FIGS. 2, 3).

The turret is rotated by rotating tube 47. The periphery of the dial 81 is indexed to indicate the positions at which each of the VHF channels is located and also the position at which the UHF channel is located. In FIG. 4, the dial shows VHF channels 5, 6 and 7; the position for UHF tuning is similarly identified. When the turret is rotated to the UHF position, tuning in the UHF spectrum is accomplished by rotating knob 74 as will be more fully explained hereinafter.

As may best be seen in FIG. 4, the UHF tuning is accomplished by rotating a UHF tuning knob 74, which is coupled to a drive sleeve 75 for driving a pulley 76. The pulley 76 transmits power through a drive chain 77 to the UHF tuning pulley 78. The UHF tuning pulley 78 is secured to a tuning sleeve 79 which linearly drives a UHF tuning plunger drive plate 80 (FIGS. 4, 5). The UHF tuning sleeve 79 also drives the UHF tuning dial 81. The details of the dial tuning device is explained in co-pending application Serial No. 303,458, filed August 9, 1952, now U.S. Patent No. 2,775,896, granted Jan. 1, 1957. The drive plate 80 is in the form of a disk having a centrally tapped hole to accommodate the threaded sleeve drive 81 which is formed at one end of the tuning sleeve 79, or it may be a separate member coupled to the sleeve 79. In addition to the centrally tapped hole, there are bored and tapped four holes to engage the threaded ends of the tuning plungers; e.g., ends 82 and 83 (FIG. 5). When the sleeve 79 is rotated the drive plate is moved linearly causing the plungers to move linearly within the cavities and vary the characteristics of the coaxial lines. The ends of the plungers are threaded to permit initial adjustment of the plungers.

Since the same oscillator tube and components, except for tuned circuit 33, are used at UHF and at VHF, fine tuning is accomplished for both through a fine tuning drive shaft knob 82. The knob 82 is coupled to a shaft 83 which drives cord 84, fine tuning pulley 85, and fine tuning shaft 86. The fine tuning shaft 86 is connected to a fine tuning condenser 87.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A rotatable tuner assembly comprising a first tuner structure including a pair of spaced disk members, individual strip members mounted between said disk members in spanning annular relation thereof, tuner elements mounted on certain said strip members and provided with contact terminals for cooperative connection with external circuits; a second tuner structure operative over a different tuning range from said first tuner, and mounted between said disk members and spaced from said strip members, said second tuner comprising a plurality of tunable circuit elements, means for tuning said circuit elements, and means for electrically coupling certain of said tunable circuits to certain of said tuning elements.

2. The tuner assembly according to claim 1, wherein said tunable circuits of said second tuner comprise cylindrical resonators.

3. A rotatable radio frequency tuner capable of operating over two distinct frequency spectrums, comprising a cylinder having a plurality of longitudinally extending cavities, electrical tuning means operable over one of said spectrums and extending into said cavities, driving means coupled to said tuning means and controlling the electrical characteristics thereof; said cylinder including an annular flange positioned intermediate the ends and normal to the axis of said cylinder, a pair of disk members secured to the respective ends of said cylinder, electrical tuning components operable over the other of said spectrums, and means for securing said components in spanning relation between said flange and said end disk members and spaced from said cylinder.

4. The tuner according to claim 3, wherein said cavities are open at one end and extend in parallel relationship to the axis of said cylinder.

5. The tuner according to claim 3, wherein the electrical tuning means in said cavities constitutes electrical resonators, and said driving means comprises a driving plate mechanically coupled to said resonators, a tuning element fixed to said plate for tuning said resonators, and a shaft member threaded into said plate for linearly moving said plate and said tuning elements.

6. A combination very high frequency-ultra high frequency tuner comprising a cylinder having a plurality of parallel, longitudinally extending ultra high frequency resonators tuned by linearly moved tuning elements, a driving plate mechanically coupled to said resonators, tuning elements fixed to said plate, a first shaft member threaded into said plate for moving said plate and tuning elements, an ultra high frequency tuning knob coupled to said shaft member; said cylinder including an annular flange positioned intermediate the ends and normal to the axis of said cylinder, a pair of disk members secured to the respective ends of said cylinder, a plurality of supporting panels for very high frequency components, means for releasably securing said components in spanning relation between said flange and said end disk members; a second shaft positioned interiorly of said first shaft but movably independent thereof, and axially coupled to said cylinder, a very high frequency tuning knob coupled to said second shaft whereby the rotation of said second shaft rotates the entire tuner assembly as a unit, and rotation of said ultra high frequency tuning knob moves linearly the tuning elements of the ultra high frequency tuner.

7. A tuner for tuning a circuit over two different frequency ranges, comprising a movable support, a first tuner including a plurality of electrical components carried by said support for co-operative connection to said circuit upon predetermined movement of said frame, a second tuner mounted within said support, terminal contacts independent of said components carried by said support and connected to said circuit in one position of said support, means providing electrical connection between said second tuner and said contact terminals, and mechanical means for selectively operating said first and second tuners over their respective tuning ranges.

8. A tuner according to claim 7, wherein said circuit comprises a heterodyne mixer and an oscillator for said mixer, said electrical components comprising coils for connection to said oscillator to tune it to different frequency operating ranges, further comprising a variable tuning element for coupling to said oscillator in said one position of said frame.

9. A tuner according to claim 8, wherein said second tuner comprises a plurality of resonant lines, means for tuning said resonant lines, over a frequency range, and means for adjusting said variable tuning element simultaneously with the tuning of said resonant lines.

10. A tuner construction comprising a rotatable support, a first tuner including a plurality of tuning elements mounted about said support for providing tuning over a first frequency range upon rotation of said frame; a second tuner comprising coaxial line resonator sections the outer conductors of which are formed by said support, and means for tuning said sections over a second frequency range; and means connecting said support to a source of ground potential, whereby complete shielding between said resonators and said tuning elements is achieved.

11. A tuner for tuning a receiver over two different radio frequency bands, comprising a first tuner tunable over a first radio frequency band comprising a support carrying tuning elements and contacts about the periphery thereof, a circuit, and means for producing a relative movement between said support and said circuit to register connection between selected of said contacts and said external circuit, and a second tuner mounted within said support comprising a tunable section tunable over a second radio frequency band, contact terminals on said support positioned for co-operative connection with said circuit in predetermined positions of said support and electrical connections between said tunable section and said contact terminals.

12. A tuner according to claim 11, further comprising mechanical means co-operatively connected to said first and second tuners respectively, for selectively adjusting the tuning of said first and second tuners.

13. A tuner for tuning an external circuit over two different frequency ranges, comprising a first tuner structure comprising a central metal support, a plurality of electrical components for co-operative connection to said external circuit, means insulatingly carrying said components about said support, a second tuner structure comprising coaxial resonators, formed as longitudinal bores in said central support, and center conductors mounted in said bores, movable tuner elements or said resonators, and mechanical means for selectively operating said first and second tuner structure over their respective tuning ranges.

14. A tuner for tuning a circuit comprising a first movable element, means mounted on said element for tuning said circuit to predetermined frequencies in a first frequency range upon movement into predetermined positions, a tunable means mounted in said movable element, means for adjusting the tuning of said tunable means over a second frequency range by movement of a tuning control relative to said movable element, and means for operatively associating said tunable means with said circuit in a predetermined position of said movable means.

15. A tuner for tuning a circuit over two different frequency ranges comprising a rotatable support, a first tuner including a plurality of electrical components carried by said support, and having contacts at spaced positions for selective co-operation with said circuit to tune it to different frequencies in a first frequency range, a second tuner including a resonator tunable over a second frequency range mounted within said support, other contacts carried by said support and spaced from the contacts of said components for co-operative connection with said circuit at a selected position of said support, and coupling means from said resonator to said other contacts.

16. In combination, a very high frequency tuner of the turret type comprising a shaft on which said turret is mounted, means for selecting a signal of a given very high frequency and means for reducing the frequency of said signal to a predetermined intermediate frequency; an ultra high frequency tuner mounted interiorly of said turret on said shaft, whereby both said tuners are contained as a single unit and mounted on a single shaft, said ultra high frequency tuner electrically coupled to said very high frequency tuner comprising means for selecting a signal of a given ultra high frequency, and means for reducing said ultra high frequency to said intermediate frequency; means for converting said very high frequency selecting means into intermediate frequency amplifying means; and means for injecting said intermediate frequency signal into said converted very high frequency tuner selecting means.

References Cited in the file of this patent

UNITED STATES PATENTS

| | | |
|---|---|---|
| 2,106,776 | Trevor | Feb. 1, 1938 |
| 2,141,756 | Linsell | Dec. 27, 1938 |
| 2,424,506 | Sands | July 22, 1947 |
| 2,496,183 | Thias | Jan. 31, 1950 |
| 2,496,322 | Wallin | Feb. 7, 1950 |
| 2,530,089 | Smith | Nov. 14, 1950 |
| 2,545,681 | Zepp | Mar. 20, 1951 |
| 2,580,895 | De Tar | Jan. 1, 1952 |
| 2,596,117 | Bell et al. | May 13, 1952 |
| 2,598,857 | Sziklai | June 3, 1952 |
| 2,600,119 | Lazzery | June 10, 1952 |
| 2,611,807 | Lazzery | Sept. 23, 1952 |
| 2,665,377 | Krepps | Jan. 5, 1954 |
| 2,700,729 | Chelgren et al. | Jan. 25, 1955 |